J. W. BLACKHAM.

Process for Ornamenting Felt Skirts.

No. 6,039. Reissued Sept. 1, 1874.

Witnesses:

Arnold Hörmann.

Wm. C. Dey.

Inventor:

Jos W. Blackham by his att'y T. L. Stetson

New York City

UNITED STATES PATENT OFFICE.

JOB W. BLACKHAM, OF BROOKLYN, NEW YORK.

IMPROVEMENT IN PROCESSES OF ORNAMENTING FELT SKIRTS.

Specification forming part of Letters Patent No. 142,554, dated September 9, 1873; reissue No. 6,039, dated September 1, 1874; application filed November 18, 1873.

*To all whom it may concern:*

Be it known that I, JOB W. BLACKHAM, of Brooklyn, Kings county, New York, have invented a certain Improvement relating to Ornamented Felt Skirts, of which the following is a specification:

The following is a description of what I consider the best means of carrying out the invention.

I apply a facing material in a loose dry state, preferably the ground brightly-colored fiber known as flock, by means of sizing, to a previously colored or filled surface. The presence of the coloring or filling matter affords a dense body, on which the sizing lies without penetrating or spreading.

It is obvious that, in lieu of flock, other coloring or surfacing material may be employed; or the operation may, if preferred, be stopped after the second printing, and the goods left without any further addition, without departing from the principle of my invention, which consists, essentially, in rendering the felt or analogous soft material non-absorbent in small distinct figures, and then printing figures on such ground with a sizing or adhesive matter which would otherwise spread beyond the proper bounds, or sink into the surface, or both, but which, lying upon the previously-filled figure, will not do so. The subsequent operation of flocking thereon improves the product still further, but is not essential to the carrying out of what I esteem an important part of my invention, because the adhesive matter applied in the second stage of my process may be available with or without subsequent addition.

The accompanying drawings form a part of this specification.

All the views are cross-sections of a small portion of a skirt magnified.

Figure 1:
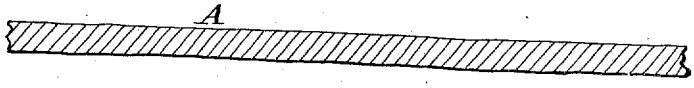
Figure 2:
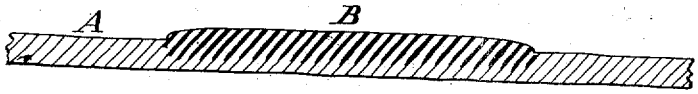
Figure 3:
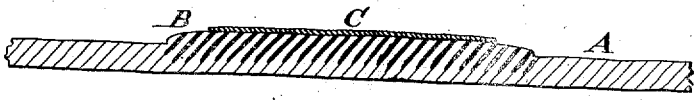

Figure 1 represents the felt in its original condition. Fig. 2 represents the same after a portion of the surface has been embossed and colored. Fig. 3 represents the same after the color has been dried, and the sizing has been printed thereon.

It will be observed that the place sized is not as large as the surface which has been embossed. I prefer to so proportion the surface.

I consider it very important that the sizing shall never extend over beyond the edge of the embossed or colored surface, so as to lie upon the unprepared felt.

Figure 4:
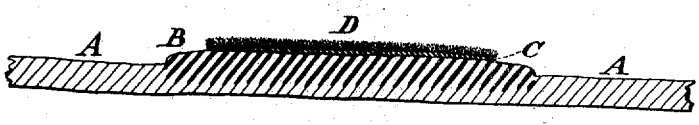

Fig. 4 represents the same after the flock has been applied, and caused to adhere over all that portion of the surface which is sized.

Similar letters of reference indicate like parts in all the figures.

A is the body of the felt where it is unaffected by the embossing and coloring. B is the part of the surface which is embossed and filled with color.

It will be understood that the coloring matter may be of any of those usually employed in embossing work, and that it is applied, by the usual means, in such quantities as to fill the interstices in the felt, and form a dense body.

C is the sizing. It may be printed upon the previously embossed and hardened surface in the same manner as sizing is usually applied upon other surfaces. D is the flock. The flock may be of any ordinary or suitable character, and may be applied by sifting or otherwise.

The loose flock which falls upon the unsized surface is afterward shaken together and saved, and the skirts are ready for packing or use.

The edges of the flocked figures are sharply defined, and the operation is conducted very successfully.

What I have herein designated as coloring-matter or color may be any of the inks or dyes ordinarily used, and adapted to stand washing, and also to form an impervious foundation for the sizing. It is not material that the color be strong, or such as would make it conspicuous, except for the subsequent flocking.

I use the term sizing to mean any adhesive fluid or semi-fluid matter, with or without color, which can be printed upon the hardened surface.

I claim as my invention—

1. The improved process of ornamenting felt skirts and analogous goods, consisting in printing or otherwise impressing upon the same figures of any desired pattern, in color, whereby the surfaces so printed are rendered non-absorbent, and then printing figures on the ground so formed with adhesive matter, and finally dusting the figures with flock or analogous loose material, substantially as described, and for the purpose set forth.

2. The process of ornamenting felt skirts and analogous goods, consisting in printing or embossing upon the same figures or patterns in color, thereby rendering the surfaces so printed non-absorbent, and then printing upon the ground so formed similar or other figures, as desired, substantially as and for the purpose set forth.

In testimony whereof I have hereunto set my hand in the presence of two subscribing witnesses.

JOB W. BLACKHAM.

Witnesses:
ARNOLD HÖRMANN,
WILLIAM C. DEY.